(12) United States Patent
Gross et al.

(10) Patent No.: US 7,687,132 B1
(45) Date of Patent: Mar. 30, 2010

(54) CERAMIC MICROTRUSS

(75) Inventors: Adam F. Gross, Los Angeles, CA (US); Alan J. Jacobsen, Santa Monica, CA (US); Robert Cumberland, Malibu, CA (US)

(73) Assignee: HRL Laboratories, LLC, Malibu, CA (US)

( * ) Notice: Subject to any disclaimer, the term of this patent is extended or adjusted under 35 U.S.C. 154(b) by 196 days.

(21) Appl. No.: 12/074,727

(22) Filed: Mar. 5, 2008

(51) Int. Cl.
*B32B 3/12* (2006.01)

(52) U.S. Cl. .............. 428/116; 428/357; 385/129; 385/130; 52/695; 52/648.1; 501/95.1

(58) Field of Classification Search .......... 428/116, 428/357; 501/95.1; 385/129, 130; 52/695, 52/648.1

See application file for complete search history.

(56) References Cited

U.S. PATENT DOCUMENTS

| | | | |
|---|---|---|---|
| 4,219,597 A * | 8/1980 | Maistre | 428/105 |
| 4,400,421 A * | 8/1983 | Stover | 428/113 |
| 4,568,595 A | 2/1986 | Morris | |
| 5,185,297 A | 2/1993 | Park et al. | |
| 5,401,694 A | 3/1995 | Gesing et al. | |
| 6,592,787 B2 | 7/2003 | Pickrell et al. | |
| 6,887,809 B1 | 5/2005 | Adler | |
| 6,941,888 B2 * | 9/2005 | Barsoum | 114/356 |
| 7,582,394 B2 * | 9/2009 | Noda et al. | 430/5 |
| 2004/0200417 A1 | 10/2004 | Hanawa et al. | |

\* cited by examiner

*Primary Examiner*—N. Edwards
(74) *Attorney, Agent, or Firm*—Christie, Parker, Hale

(57) ABSTRACT

An ordered ceramic microstructure and a method of making the same. In one embodiment, the ceramic microstructure includes a base structure and one or more ceramic layers. The base structure includes a plurality of first truss elements defined by a plurality of first self-propagating polymer waveguides and extending along a first direction, a plurality of second truss elements defined by a plurality of second self-propagating polymer waveguides and extending along a second direction, and a plurality of third truss elements defined by a plurality of third self-propagating polymer waveguides and extending along a third direction. Here, the first, second, and third truss elements interpenetrate each other at a plurality of nodes to form a continuous material, and the base structure is self-supporting. In addition, the ceramic layers coat a surface of at least one truss element of the first truss elements, the second truss elements, or the third truss elements.

11 Claims, 11 Drawing Sheets

CERAMIC MICROTRUSS

FIELD OF THE INVENTION

The present invention relates to an ordered ceramic microstructure (or microtruss structure) and a method of making the same.

BACKGROUND OF THE INVENTION

Ceramic foams can have the form of a polymer foam while being made of a sintered ceramic. They are stable at high temperatures and have attractive strength to weight ratios. However, ceramic foams are not ordered microstructures and suffer from the random interconnections in their form, thereby reducing the strength of the materials. If a material could be formed on an ordered microstructure instead of a disordered microstructure, a stronger material with possibly lower mass could be formed.

As such, there is a need for a ceramic material having an ordered microstructure.

SUMMARY OF THE INVENTION

Aspects of embodiments of the present invention are directed towards an ordered ceramic microstructure (or microtruss structure) and a method of making the same.

An embodiment of the present invention provides a ceramic material made of ordered ceramic rods (or trusses). These rods can be all ceramic, they may be polymer, carbon, or metal rods coated with ceramic, or they may be a reverse structure of a truss made from a ceramic. These structures should have the high temperature stability of ceramic foams with higher strength, light weight, and better insulating properties.

In one embodiment of the present invention, an optically template polymer scaffold (or ordered three-dimensional microstructure) is utilized to determine the final shape and dimensions of the ordered ceramic microstructure.

More specifically, in an embodiment of the present invention, a three-dimensional ordered ceramic microstructure is provided. Here, the three-dimensional ordered ceramic microstructure includes a base structure (or scaffold) and one or more ceramic layers coating a surface of the base structure. The base structure includes a plurality of first truss elements defined by a plurality of first self-propagating polymer waveguides and extending along a first direction, a plurality of second truss elements defined by a plurality of second self-propagating polymer waveguides and extending along a second direction, and a plurality of third truss elements defined by a plurality of third self-propagating polymer waveguides and extending along a third direction. Here, the first, second, and third truss elements interpenetrate each other at a plurality of nodes to form a continuous material, and the base structure is self-supporting. In addition, the one or more ceramic layers coat a surface of at least one truss element of the first truss elements, the second truss elements, or the third truss elements.

In one embodiment, the one or more ceramic layers are vapor deposited or infiltrated ceramic layers (or are formed via chemical vapor deposition, chemical vapor infiltration, plasma enhanced chemical vapor deposition, and/or other gas phase deposition technique). That is, the ceramic layers are formed by the precursor solidifying or decomposing on the surface of the truss element. The one or more ceramic layers may include a material selected from the group consisting of silicon carbide, silicon nitride, hafnium carbide, chromium carbide, boron nitride, boron carbide, aluminum oxide, titanium diboride, titanium nitride, zirconium dioxide, titanium carbide, titanium carbonitride, tantalum carbide, tantalum nitride, and combinations thereof.

In one embodiment, the one or more ceramic layers are formed via a reaction between a material of the base structure and a reactant, the reactant being a gas or a liquid. The reactant may include a material selected from the group consisting of silicon carbide, hafnium carbide, chromium carbide, aluminum oxide, zirconium dioxide, trichlorosilane, silane, diatomic oxygen, and combinations thereof. The reaction between the material of the base structure and the reactant may transform the base structure into a substantially ceramic microstructure.

In one embodiment, the one or more ceramic layers are formed via heating of a preceramic polymer applied to the base structure. The preceramic polymer may include a material selected from the group consisting of Starfire RD-633, Starfire SMP-10, Starfire SOC-A35, polysilazanes, polycarbosilanes, silicone resins, polysilanes, polyvinylborazine, polyborazylene, borazine-modified hydrldopolysilazanes, decaborane-based polymers, and combinations thereof.

In one embodiment, each of the first, second, and third truss elements has an axial diameter ranging from about 0.5 mm to about 1 μm.

In one embodiment, the one or more ceramic layers are formed by converting a coating of one or more first ceramic species into one or more second ceramic species.

According to another embodiment of the present invention, a three-dimensional ordered ceramic microstructure includes a plurality of first truss elements defined by a plurality of first self-propagating polymer waveguides and extending along a first direction, a plurality of second truss elements defined by a plurality of second self-propagating polymer waveguides and extending along a second direction, and a plurality of third truss elements defined by a plurality of third self-propagating polymer waveguides and extending along a third direction. Here, the first, second, and third truss elements interpenetrate each other at a plurality of nodes to form a continuous material, the continuous material is self-supporting, and each of the first, second, and third truss elements includes a ceramic material.

According to another embodiment of the present invention, a method of forming a three-dimensional ordered ceramic microstructure is provided. The method includes: securing a volume of a photo-monomer; securing a mask between at least one collimated light source and the volume of the photo-monomer and the volume of the photo-monomer, the mask having a plurality of apertures; directing a collimated light beam from the at least one collimated light source to the mask for a period of exposure time such that a portion of the collimated light beam passes through the mask and is guided by the plurality of apertures into the photo-monomer to form a plurality of waveguides through a portion of the volume of the photo-monomer; removing any uncured photo-monomer to leave behind a three-dimensional polymer microstructure having a plurality of truss elements defined by the plurality of waveguides; and forming one or more ceramic layers on at least one of the truss elements.

In one embodiment, the forming the one or more ceramic layers includes applying a vapor of a chemical precursor to the at least one of the truss elements. The chemical precursor may include a material selected from the group consisting of silicon carbide, silicon nitride, hafnium carbide, chromium carbide, boron nitride, boron carbide, aluminum oxide, titanium diboride, titanium nitride, zirconium dioxide, titanium carbide, titanium carbonitride, tantalum carbide, tantalum nitride, and combinations thereof.

In one embodiment, the forming the one or more ceramic layers includes initiating a reaction between a material of the structure and a reactant, the reactant being a gas or a liquid. The reactant may include a material selected from the group consisting of silicon carbide, hafnium carbide, chromium carbide, aluminum oxide, zirconium dioxide, trichlorosilane, silane, diatomic oxygen, and combinations thereof.

In one embodiment, the forming the one or more ceramic layers includes applying a preceramic polymer to the at least one of the truss elements and heating the preceramic polymer and the at least one of the truss elements. The preceramic polymer may include a material selected from the group consisting of Starfire RD-633, Starfire SMP-10, Starfire SOC-A35, polysilazanes, polycarbosilanes, silicone resins, polysilanes, polyvinylborazine, polyborazylene, borazine-modified hydrldopolysilazanes, decaborane-based polymers, and combinations thereof.

In one embodiment, the forming the one or more ceramic layers includes converting a coating of one or more first ceramic species into one or more second ceramic species. The covering the coating of the one or more first ceramic species into the one or more second ceramic species includes heating a first coating of silicon carbide, tantalum carbide, or titanium carbide in nitrogen gas to transform the first coating into a second coating of silicon nitride, titanium nitride, or tantalum nitride.

According to another embodiment of the present invention, a method of forming a three-dimensional ordered ceramic microstructure is provided. The method includes: securing a volume of a photo-monomer; securing a mask between at least one collimated light source and the volume of the photo-monomer and the volume of the photo-monomer, the mask having a plurality of apertures; directing a collimated light beam from the at least one collimated light source to the mask for a period of exposure time such that a portion of the collimated light beam passes through the mask and is guided by the plurality of apertures into the photo-monomer to form a plurality of waveguides through a portion of the volume of the photo-monomer; removing any uncured photo-monomer to leave behind a three-dimensional polymer microstructure defined by the plurality of waveguides; forming a reverse mold of the three-dimensional polymer microstructure; filling the reverse mold with a preceramic polymer or ceramic slurry; curing the preceramic polymer or ceramic slurry; and removing the reverse mold to leave behind the three-dimensional ordered ceramic microstructure.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

In the following detailed description, only certain exemplary embodiments of the present invention are shown and described, by way of illustration. As those skilled in the art would recognize, the described exemplary embodiments may be modified in various ways, all without departing from the spirit or scope of the present invention. Accordingly, the drawings and description are to be regarded as illustrative in nature, and not restrictive.

In the context of embodiments of the present invention, an ordered three-dimensional (3D) microstructure is referred to as an ordered 3D structure at the micrometer scale. In addition, a ceramic microtruss (or an ordered ceramic microstructure) can be referred to as an ordered 3D microstructure (or microstruss structure) made of ceramic. In one embodiment of the present invention, an optically template polymer scaffold (or ordered three-dimensional polymer microstructure) is utilized to determine the final shape and dimensions of the ordered ceramic microstructure.

Figure 1:
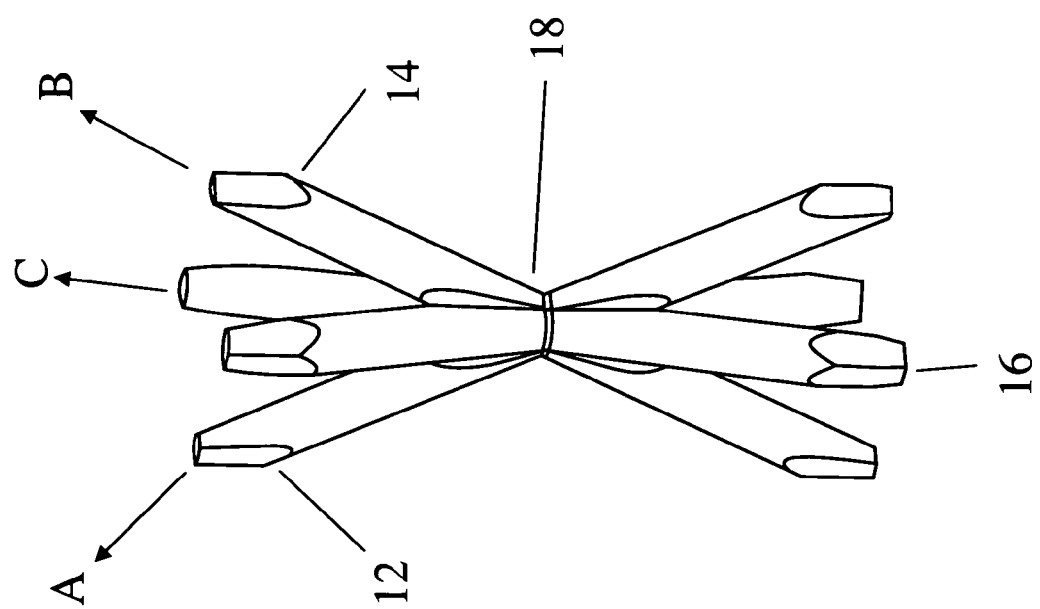
FIG. 1 is a perspective schematic view of a portion of a structure according to an embodiment of the present invention.
Figure 1:
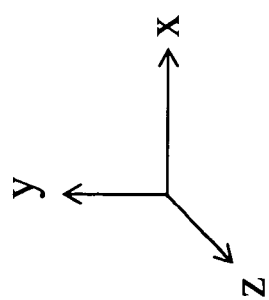
Figure 2:
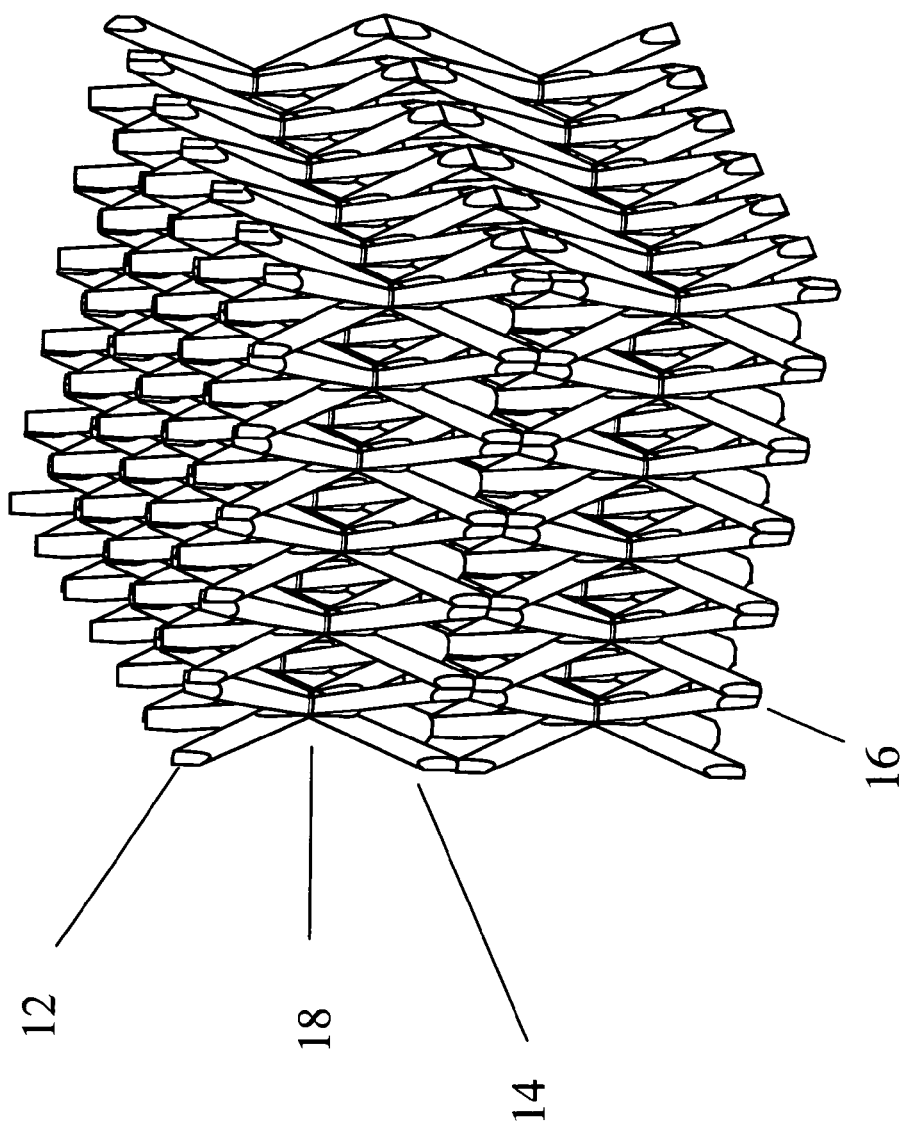
FIG. 2 is a perspective schematic view of a structure according to an embodiment of the present invention.

Referring to FIGS. 1 and 2, a three-dimensional ordered open-cellular microstructure 10, according to an embodiment of the present invention, is a self-supporting structure. In one embodiment of the present invention, this three-dimensional ordered open-cellular microstructure 10 can be utilized as a template scaffold (e.g., a polymer scaffold) to determine the final shape and dimensions of the ordered ceramic microstructure. The structure 10 includes first truss elements 12, second truss elements 14, and third truss elements 16. The first truss elements 12 are defined by first self-propagating polymer waveguides and extend along a first direction A. The second truss elements 14 are defined by second self-propagating polymer waveguides and extend along a second direction B. The third truss elements 16 are defined by third self-propagating polymer waveguides and extend along a third direction C. With reference to FIGS. 1 and 2, the truss elements 12, 14, 16 interpenetrate each other at nodes 18 to form a continuous material.

In one embodiment, the truss elements 12, 14, 16 include a photo-polymer material. In one embodiment, the truss elements 12, 14, 16 are polymer optical waveguide truss elements.

In one embodiment, the continuous material is continuously formed such that it lacks any interior boundaries, e.g., boundaries within the interpenetrating portions of truss elements 12, 14, 16. In another embodiment, each node 18 of the structure 10 is formed of the continuous material.

According to one embodiment of the present invention, the structure 10 is formed by using a fixed light input (collimated UV light) to cure (polymerize) polymer optical waveguides, which can self-propagate in a 3D pattern. As such, the propagated polymer optical waveguides form the structure 10.

As disclosed in Monro et al. "Topical Review Catching Light In Its Own Trap," Journal Of Modern Optics, 2001, Vol. 48, No. 2, 191-238, which is incorporated by reference herein in its entirety, some liquid polymers, referred to as photopolymers, undergo a refractive index change during the polymerization process. The refractive index change can lead to a formation of polymer optical waveguides. If a monomer that is photo-sensitive is exposed to light (typically UV) under the right conditions, the initial area of polymerization, such as a small circular area, will "trap" the light and guide it to the tip of the polymerized region, further advancing that polymerized region. This process will continue, leading to the formation of a waveguide structure with approximately the same cross-sectional dimensions along its entire length.

According to one embodiment of the present invention, a mask with a two-dimensional pattern of apertures (see FIG. 3) is used to create a three-dimensional polymer microstructure.

Figure 3:
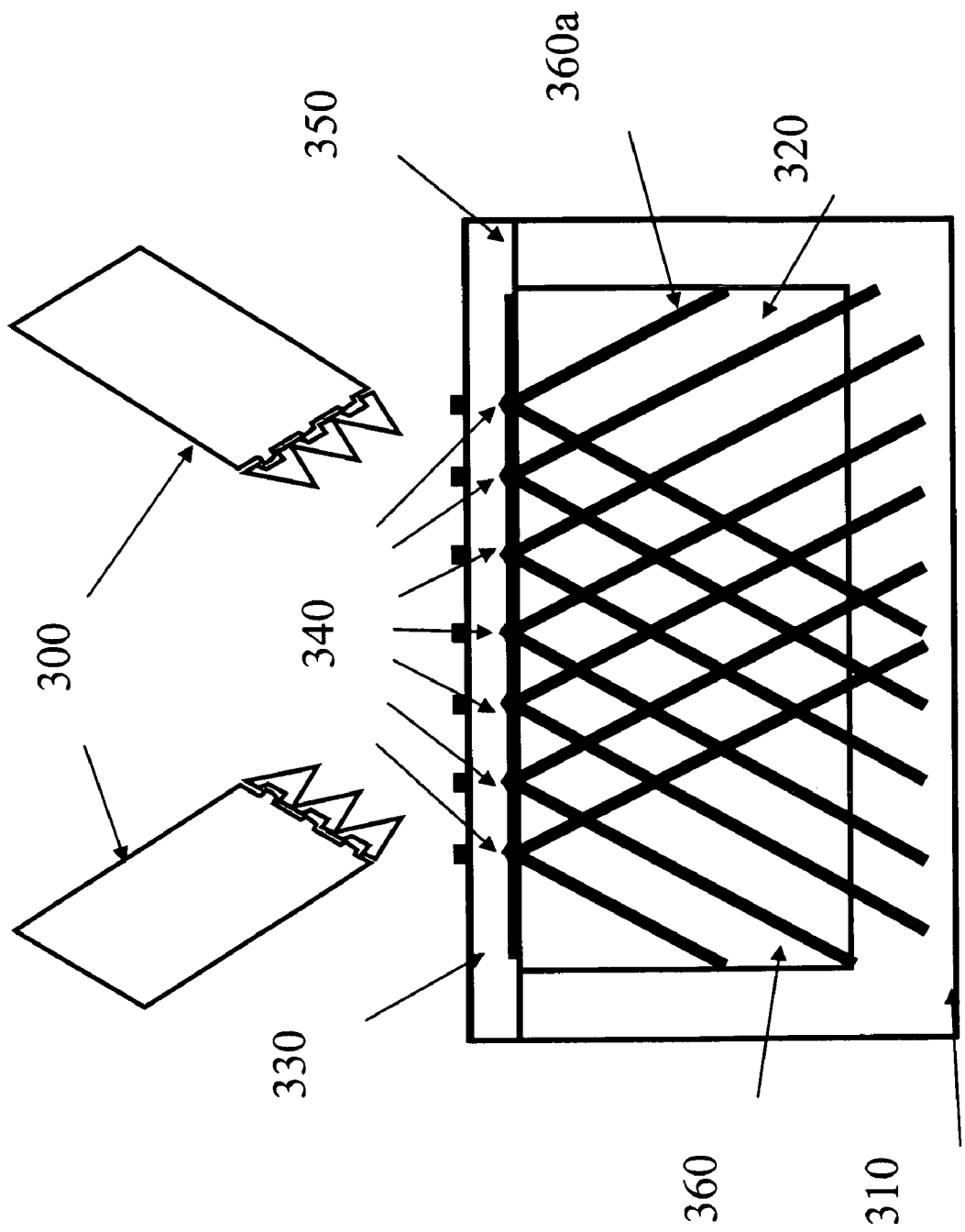
FIG. 3 is a schematic diagram of a system for forming a structure of an embodiment of the present invention from multiple waveguides created using a single collimated beam or multiple collimated beams through multiple apertures.
Figure 4B:
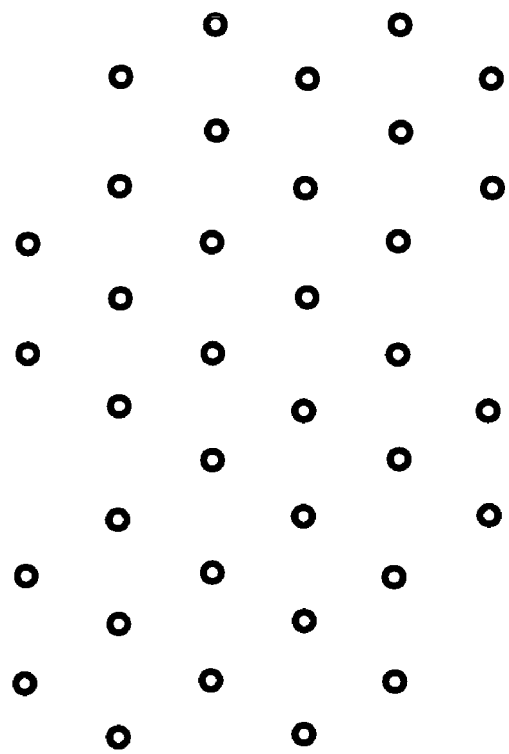
FIG. 4b illustrates an example of a hexagonal mask pattern (or a hexagonal mask aperture pattern) according to embodiments of the present invention.
Figure 4A:
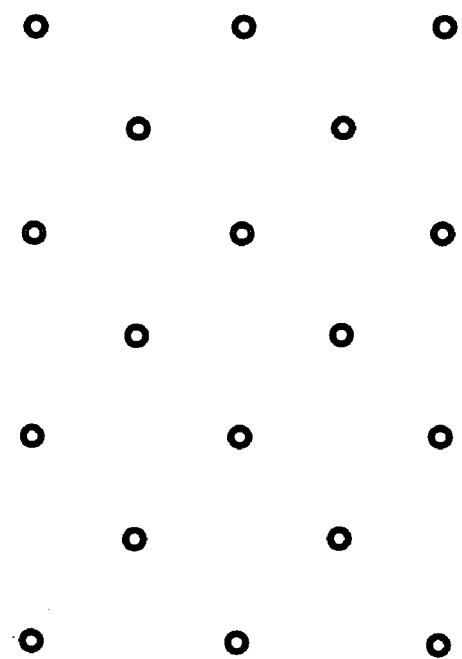
FIG. 4a illustrates an example of a square mask pattern (or a square mask aperture pattern) according to embodiments of the present invention.

With reference to FIG. 3, a system for forming a 3D polymer microstructure according to an embodiment of the present invention includes one or more collimated light sources 300, a reservoir (mold) 310 having a volume of monomer 320 that will polymerize at a wavelength of collimated light beams provided by the light sources 300, and a patterning apparatus, such as a mask 330 with multiple apertures (open areas) 340. Each of the apertures 340 has a given shape and dimension substantially matching a cross-section geometry of a waveguide (e.g., waveguide 360a). Between the mask 330 and the monomer 320, there may be a substrate 350. Here, in FIG. 3, a truly 3D network can be formed because the intersecting polymer waveguides 360 will simply polymerize together, but will not interfere with waveguide propagation. Also, the spacing between the plurality of waveguides 360 corresponds with the pattern of the plurality of apertures 340. The pattern of the apertures 340 may, for example, be in a square pattern as shown in FIG. 4a and/or in a hexagonal pattern as shown in FIG. 4b. The hole (aperture) spacing, i.e., distance between apertures 340 in the mask 330, and the number of waveguides 360 formed from each of the apertures 340 will determine the open volume fraction (i.e. open space) of the formed 3D microstructure.

As such, through the system of FIG. 3, a 3D microstructure (or a 3D ordered polymer microstructure) of an embodiment of the present invention can be designed for a given application. The design parameters include: 1) the angle and pattern of the polymer waveguides with respect to one another, 2) the packing, or relative density of the resulting cellular structure (or the open volume fraction), and 3) the cross-sectional shape and dimensions of the polymer waveguides.

Figure 5:
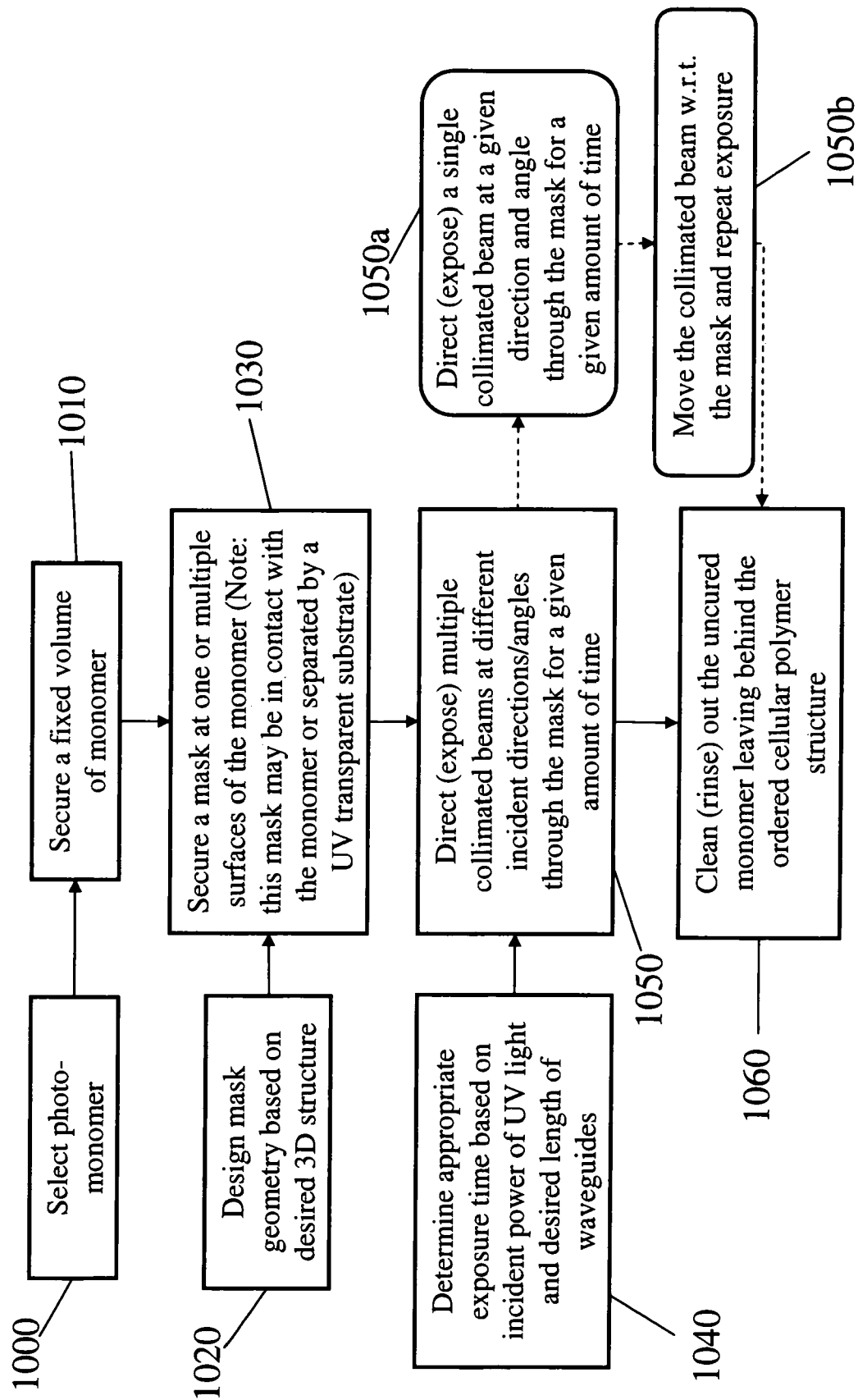
FIG. 5 is a process flow diagram for forming one or more polymer waveguides of a structure according to an embodiment of the present invention.

In more detail, FIG. 5 shows a method of forming a 3D ordered microstructure according to an embodiment of the present invention. As illustrated in FIG. 5, a photo-monomer is selected in block 1000. In block 1010, a volume of the selected photo-monomer is secured (e.g., in a reservoir). A mask geometry is designed based on a desired 3D structure in block 1020. A patterning apparatus, such as a mask having the designed geometry, is secured in block 1030. Here, the secured mask has at least one aperture between at least one collimated light source and the volume of the selected photo-monomer. In addition, the mask may be in contact with the monomer or separated by a substrate (e.g., by a UV transparent substrate).

In block 1040, an appropriate exposure time is determined based on incident power of a collimated light beam from the at least one collimated light source (e.g., an incident power of a UV light) and a desired length of one or more waveguides. The collimated light beam from the at least one collimated light source is directed to the mask for a period of exposure time so that a portion of the collimated beam passes through the mask and is guided by the at least one aperture into the photo-monomer to form at least one waveguide through a portion of the volume of the photo-monomer. Here, the at least one waveguide has a cross-sectional geometry substantially matching the designed aperture geometry on the mask.

In one embodiment as shown in block 1050, multiple collimated beams at different incident directions and/or angles are directed through the mask for a given amount of time.

Alternatively, as shown in blocks 1050a, a single collimated beam at a given direction and angle is directed through the mask for a given amount of time. Then, at block 1050b, the collimated light beam is moved with respect to the mask and the exposure is repeated.

Then, at block 1060, any uncured photo-monomer is removed to leave behind a 3D ordered polymer microstructure. Here, in one embodiment, the plurality of polymer waveguides are used to form the 3D ordered polymer microstructure, and the 3D ordered polymer microstructure corresponds with the pattern of the plurality of apertures.

The resulting 3D polymer microstructure can be formed in seconds in the area where exposed to the incident collimated beam. Since the incident light and the monomer remain fixed with respect to one another during the formation of a polymer waveguide, the exposure area of the collimated beam(s) can be scanned over a larger surface area of monomer, leading to the formation of large-area structures. Alternatively, in one embodiment, a volume of monomer can continuously be fed under a fixed incident light pattern (created from a mask and collimated light) leading to a path for mass production.

As described, once the polymer cellular structure is formed in the volume of monomer, the remaining un-polymerized material (monomer) is removed leaving an open cellular polymer material that is the ordered 3D microstructure. By way of example, a solvent that dissolves the monomer (but not the polymer) may be used to aid in the monomer removal.

With reference back to FIGS. 1 and 2, the truss elements 12, 14, 16 of the structure 10 define an open volume (i.e. free space) of the structure 10. In one embodiment, the structure 10 defines a free space of not less than about 40% by volume and not greater than about 99% by volume. In another embodiment, the structure 10 defines a free space of not less than about 70% by volume and not greater than about 95% by volume.

The truss elements 12, 14, 16 intersect at the nodes 18 to form symmetrical angles in three dimensions (three orthogonal directions). The symmetrical angles relative to the xz-plane (see, FIG. 1), can measure between 0° and 90°. That is, truss elements 12, 14, 16 interpenetrate each other to form "perfect" nodes: each of the truss elements 12, 14, 16 defines an angle relative to a compression surface of the structure 10 (e.g. a surface extending along a direction of the xz-plane), and the respective angles defined by the truss elements 12, 14, 16 are substantially equal to one another. However, embodiments of the present invention are not limited thereto.

The truss elements 12, 14, 16 have an intrinsically high strength due to their small scale. In one embodiment, each of the truss elements 12, 14, 16 has an axial diameter of not greater than about 500 μm.

In another embodiment, each of the truss elements 12, 14, 16 has an axial diameter of not greater than about 200 μm. In another embodiment, each of the truss elements 12, 14, 16 has an axial diameter of not greater than about 1 μm. The truss elements 12, 14, 16 are configured to have a correspondingly small aspect ratio (e.g., length/diameter ratio) for withstanding a bending moment. Here, each of the truss elements 12, 14, 16 has a length not greater than 100 μm such that the truss elements can better withstand a mechanical load applied to the structure 10. As such, the truss elements 12, 14, 16 experience little, if any, bending deformation during application of the mechanical load to the structure 10.

At certain size scales (e.g., the size scales described above), the strength of the truss elements is increased, which corresponds to an increased strength of the structure 10. In one embodiment, each of the truss elements 12, 14, 16 has molecular alignment extending along an axial direction of the truss element. As such, an anisotropic material is produced, which provides a substantial degree of stiffness and/or strength along the axial direction. In one embodiment, in a material that is composed of long molecular chains (e.g., polymers), the molecules thereof can be aligned along a direction to provide an increased degree of mechanical strength and/or stiffness along the alignment direction. In more detail, where the molecular alignments of the truss elements 12, 14, 16 extend along the corresponding axial directions, the truss elements 12, 14, 16 are configured to axially transfer a mechanical load applied to the structure 10.

As described above, the structure 10 withstands the mechanical load, e.g., via axial tension and compression of the truss elements 12, 14, 16. Molecular alignment of the truss elements 12, 14, 16 along their respective axial directions lends additional strength and/or stiffness to the truss elements 12, 14, 16 and, accordingly, also to the structure 10.

In one embodiment, the truss elements 12, 14, 16 are configured to provide the structure 10 with a stretch-dominated behavior under a compression load applied to the structure 10. Such stretch-dominated behavior is contrasted from the bending-dominated behavior (e.g. of randomly oriented cellular structures), as described in Ashby, "The Properties Of Foam And Lattices," Philosophical Transactions—Royal Society Of London Series A Mathematical Physical And Engineering Sciences, Vol. 364, 2006, which is incorporated by reference herein in its entirety.

In a bending-dominated structure, the elastic modulus is proportional to the square of the relative density $\rho'/\rho_s'$, where $\rho'$ is the density of the cellular material and $\rho_s'$ is the density of the solid from which it is constructed. In contrast, a stretch-dominated structure (such as structure 10), has a compressive elastic modulus (E) directly proportional to both the relative density thereof and the modulus ($E_s$) of the solid material portion of the structure 10, as expressed in equation (1) below:

$$E = E_s(\sin^4\theta)(\rho/\rho_s) \quad (1)$$

where $\rho$ is a density of the structure 10, $\rho_s$ is a density of a solid material portion of the structure 10, $\theta$ is an angle of at least one of the truss elements 12, 14, 16 relative to a compression surface of the structure 10, and $E_s$ is a modulus of the solid material portion of the structure 10. As such, the elastic modulus of a structure of embodiments of the present invention is also proportional to a geometric function of the angle $\theta$ of the structure, and $\theta$ can accordingly be chosen to vary (e.g., increase or reduce) the elastic modulus.

Figure 6:
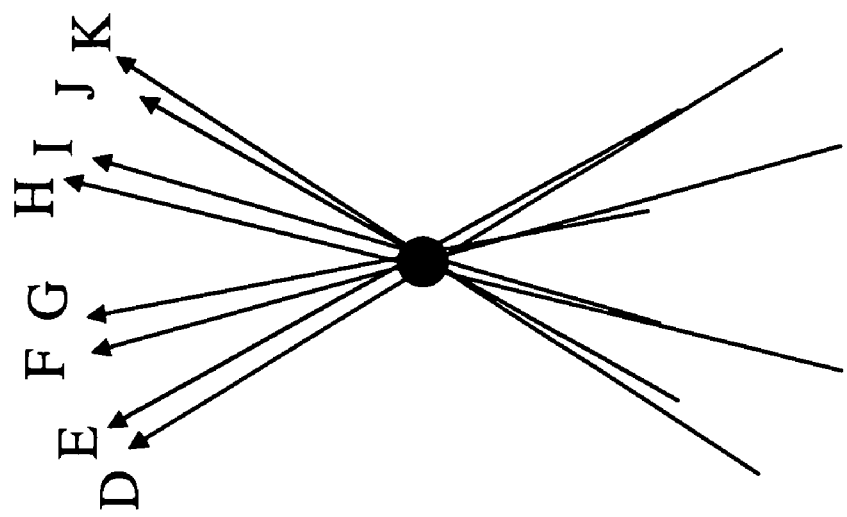
FIG. 6 is a perspective schematic view showing respective directions along which truss elements of a structure of an embodiment of the present invention extend.

With reference back to FIGS. 1 and 2, the structure 10 includes truss elements 12, 14, 16 respectively extending along A, B, and C directions. However, embodiments of the present invention are not limited thereto. For example, with reference to FIG. 6, a structure of an embodiment of the present invention may include truss elements defined by self-propagating polymer waveguides and extending along D, E, F, G, H, I, J and K directions, respectively. For example, a structure according to an embodiment of the present invention may include eight truss-elements, each of which extends along a corresponding one of eight varying directions. Here, similar to the embodiment shown in FIGS. 1 and 2, the eight truss elements interpenetrate each to form nodes of a continuous material. However, embodiments of the present invention are not limited thereto, and may include more or fewer than eight truss elements.

In a further embodiment of the present invention, an open volume of a cellular structure is filled at least partially with a material different from the material of the cellular structure itself, thereby creating an ordered bi-phase composite. Also in a further embodiment of the present invention, one or more truss elements of a cellular structure are coated with a material different from the material of the cellular structural itself to adjust the thermal behavior thereof. Also in a further embodiment of the present invention, base elements of a cellular structure are coated with a material different from the material of the cellular structural itself, and the base elements are removed to create a self-supporting structure having continuous but separated volumes.

The size scale and the features of structures of embodiments of the present invention can be utilized in heat transfer applications.

In one embodiment of this invention, an apparatus for storing thermal energy includes (or is fabricated with) a three-dimensional ordered open-cellular microstructure as a polymer scaffold. The geometry for the polymer scaffold according to an embodiment of the present invention is shown in FIG. 2 as described above. Here, in one embodiment, the truss elements (or rods) 12, 14, 16 that make up the structure (or scaffold) 10 ranges from about 1 μm to about 0.5 mm (or from 10 μm to 0.5 mm) in diameter. While the truss elements 12, 14, 16 for the scaffold 10 in FIG. 2 are shown to be interpenetrating, the present invention is not thereby limited. For example, the truss elements (or rods) could all be parallel as well. Once the structure 10 is formed, it can be made into a heat exchanger or heat storage composite as described in more detail below.

One embodiment of the present invention provides a ceramic material made of ordered ceramic rods (or truss elements). These rods can be all ceramic, they may be polymer, carbon, or metal rods coated with ceramic, or they may be a reverse structure of a truss made from a ceramic. These structures should have the high temperature stability of ceramic foams with higher strength.

As envisioned, embodiments of the present invention are directed toward high strength ceramics that are very lightweight. Additionally, structured ceramic trusses could be incorporated into armor. Low dielectric materials with multiple air-ceramic gaps may be fabricated from ceramic microtrusses as well. Father, ceramic materials are stable to radiation in space and ceramic microtrusses could act as structural materials in satellites.

Embodiments of the present invention are based upon a polymer scaffold as described above with reference to FIGS. 1 to 6. Here, the initially fabricated polymer scaffold templates the ceramic, metal, polymer, or carbon scaffold used in the embodiments of the present invention. A possible geometry for a scaffold is shown in FIG. 2, but the present invention is not thereby limited.

In one embodiment, each of the rods (or truss elements) that make up the truss has a diameter ranging from 1 micron to 0.5 mm. In one embodiment, the scaffold has from 50% to 90% of the total volume as free space. While the rods for a scaffold in FIG. 2 are interpenetrating, they could all be parallel as well. The scaffold may be made of one material, or it may have a coating of one material on another (for example nickel coated on a polymer scaffold) prior to deposition of the ceramic.

Figure 7:
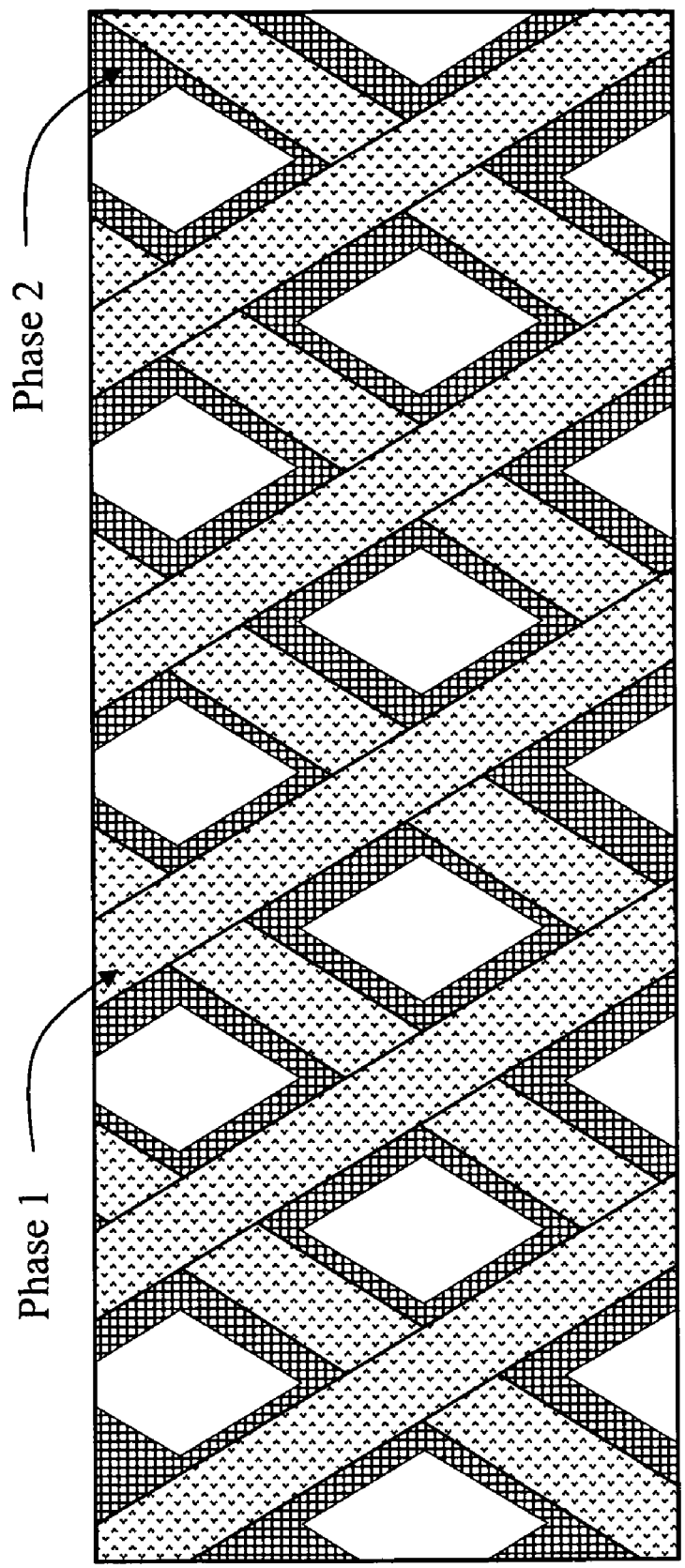
FIG. 7 is a cross-sectional schematic view showing a three-dimensional ordered ceramic microstructure according to an embodiment of the present invention.

In one embodiment, chemical vapor deposition, reaction with a gas or liquid phase molecule, and/or preceramic polymers is used to deposit a polymer on the surface of the scaffold. FIG. 7 shows a structure according to an embodiment in which Phase 1 is the scaffold and Phase 2 is the ceramic coating. Alternatively the whole truss may be ceramic. In this case both Phase 1 and Phase 2 in FIG. 7 would each be a ceramic material.

Figure 11:
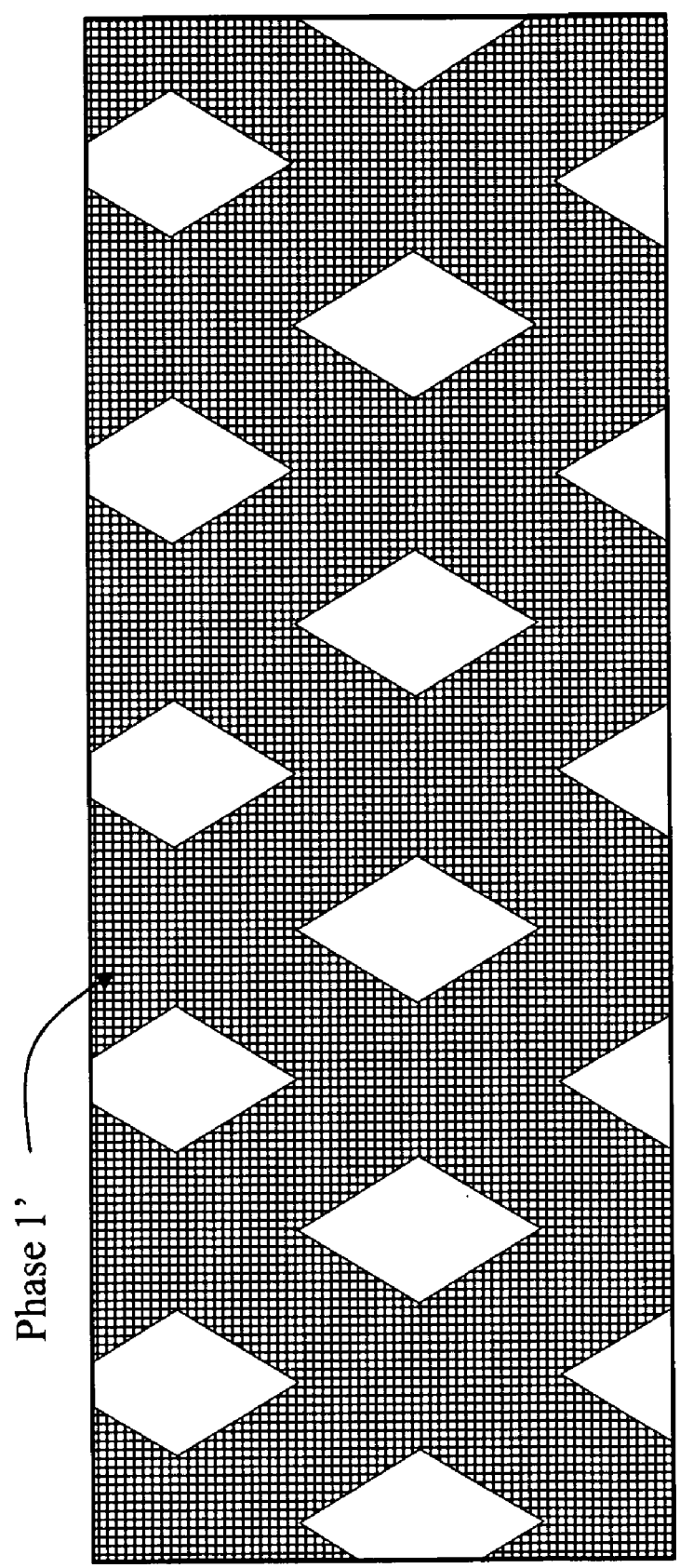
FIG. 11 is a cross-sectional schematic view showing a three-dimensional ordered ceramic microstructure according to another embodiment of the present invention.

In another embodiment, a reverse mold of the scaffold is formed from the scaffold (i.e., a three-dimensional polymer microstructure). Here, in this embodiment, a three-dimensional ordered ceramic microstructure as shown in FIG. 11 is formed from the reverse mold by filling the reverse mold with a preceramic polymer or ceramic slurry and curing the preceramic polymer or ceramic slurry. In FIG. 11, the three-dimensional ordered ceramic microstructure includes only a ceramic material as indicated by Phase 1'.

Chemical Vapor Deposition

For chemical vapor deposition, a base structure (or scaffold) according to an embodiment of the present invention is placed in an evacuated chamber. The base structure is heated to at least 100° C. and then a vapor of a chemical precursor is introduced. When the vapor comes into contact with the heated base structure, it decomposes and forms a ceramic coating. Ceramics such as silicon carbide, silicon nitride, hafnium carbide, chromium carbide, boron nitride, boron carbide, aluminum oxide, titanium diboride, titanium nitride, zirconium dioxide, titanium carbide, titanium carbonitride, tantalum carbide, and tantalum nitride may be deposited.

Ceramic Through Reaction with the Scaffold

To form a ceramic through reaction with a scaffold according to an embodiment of the present invention, the scaffold is reacted with a molecule in the liquid or gas phase, usually at elevated temperature. This embodiment can be used to substantially maintain the shape of the scaffold. The scaffold may be completely transformed into a ceramic, or if a less than stoichiometric amount of reactant is used, the scaffold will have a core of the original material surrounded by a ceramic overcoat. Carbides such as SiC, HfC, $Cr_3C_2$, oxides such as $Al_2O_3$ and $ZrO_2$, or nitrides such as $Si_3N_4$, TaC, and $TiCN_2$ may be formed in this manner.

The following examples illustrate the present invention in more detail. However, the present invention is not limited by these examples.

EXAMPLE 1

1. A graphite scaffold (or base structure) weighing 0.068 g is pumped into an oxygen and moisture free glove box.

2. The scaffold is placed in a 125 mL Parr Acid Digestion Bomb (autoclave) with 2 mL trichlorosilane.

3. The autoclave is sealed in the glove box.

4. The autoclave is then removed from the glove box and placed in a 250° C. oven for 12 h.

5. After 12 h, the autoclave is removed and cooled to room temperature. It is opened in a fume hood, the scaffold is removed, and washed with chloroform to remove residual trichlorosilane. Here, the scaffold is now coated with amorphous SiC.

EXAMPLE 2

1. A graphite scaffold weighing 0.072 g is pumped into an oxygen and moisture free glove box.

2. The scaffold and 1.9 mL trichlorosilane is placed in a 4" long ½" diameter steel tube. Both sides are sealed with SwageLock end caps in the glove box.

3. The tube is then removed and placed in a 500° C. oven for 6 h.

4. After 6 h, the tube is removed and cooled to room temperature. It is cut open in a fume hood and the scaffold is removed and washed with chloroform to remove residual trichlorosilane.

Figure 8:
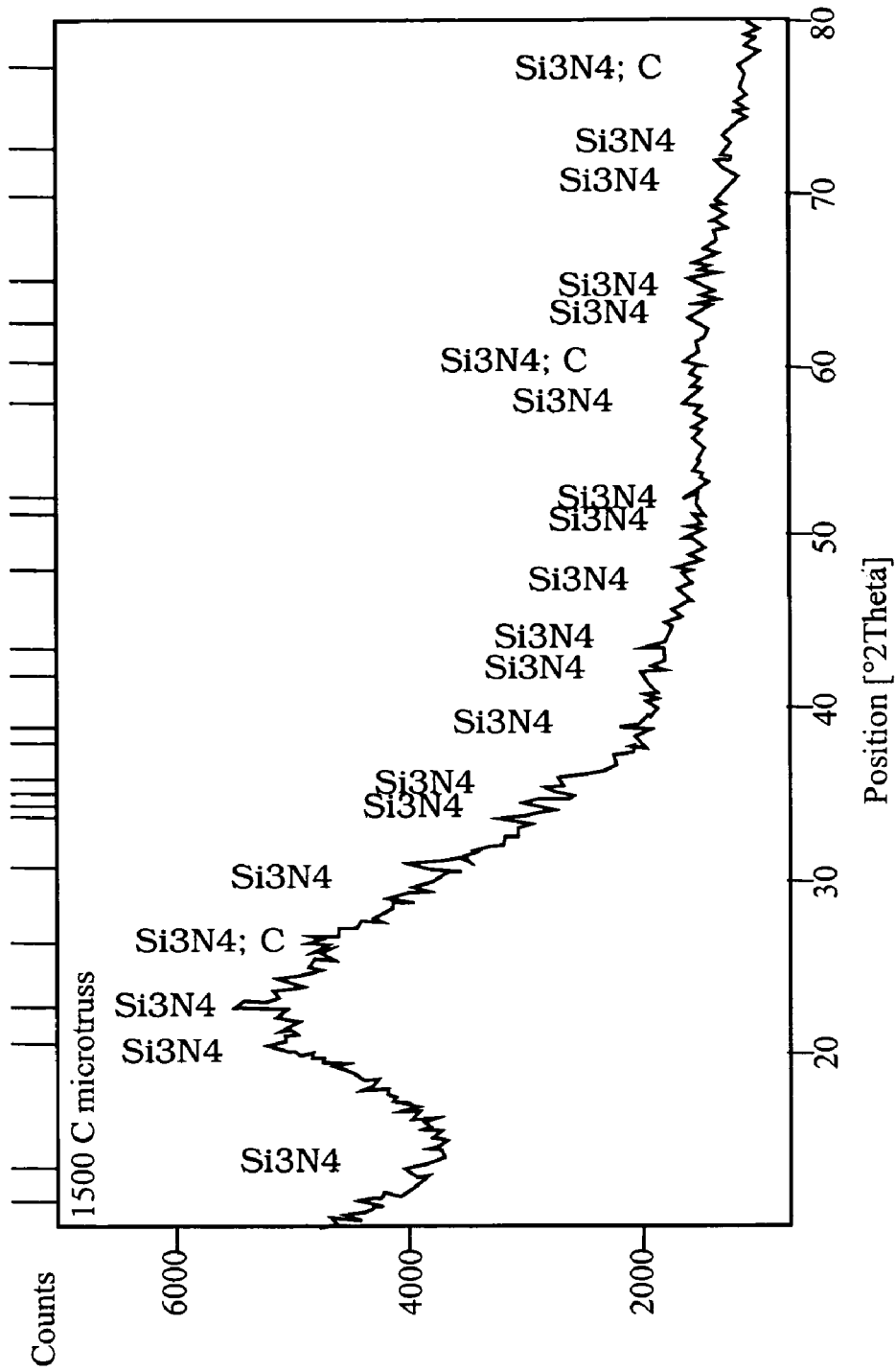
FIG. 8 shows X-ray Diffraction (XRD) pattern of a three-dimensional ordered ceramic microstructure according to an embodiment of the present invention.

5. In a tube furnace under flowing $N_2$, the sample is heated at 3° C./min to 1500° C., held at 1500° C. for one hour, and then cooled at 5° C./min. Here, the end product was a light gray colored $Si_3N_4$ microtruss. FIG. 8 shows the XRD pattern of the microtruss formed according to Example 2. As shown in FIG. 8, the XRD peaks index to either silicon nitride or graphitic carbon, both of which are expected in this microtruss.

Preceramic Polymers

Preceramic polymers may be used to coat a ceramic onto a scaffold. Ceramic is applied by dipping the scaffold into a dilute or neat solution of preceramic polymers and then heating the coated scaffold under inert atmosphere. Ceramics such as SiC, SiOC, $SiO_2$, and $Si_3N_4$, SiNC, and boron carbides may be deposited. Examples of applicable preceramic polymers are Starfire RD-633, Starfire SMP-10, Starfire SOC-A35, Clariant/KiON Ceraset 20 (polysilazanes), polycarbosilanes, silicone resins, polysilanes, polyvinylborazine, polyborazylene, borazine-modified hydrldopolysilazanes, and decaborane based polymers.

EXAMPLE 3

1. A graphite scaffold is dried in an oven at 100° C.

2. A 1:1 vol:vol solution of RD-633 by Starfire Systems and OS-20 by Dow Corning was made.

3. The graphite scaffold is soaked in the RD-633 solution. It is removed and then placed in a $N_2$ purged tube furnace.

4. The furnace is heated at 1° C./min to 850° C., and then held at 850° C. for 1 h. The furnace is then cooled at 5° C./min.

5. Steps 3 & 4 are repeated two times. That is, to fill the scaffold with ceramic, it is impregnated and heated for multiple cycles.

EXAMPLE 4

1. A graphite scaffold is dried in an oven at 100° C.

2. The graphite scaffold is soaked in RD-633 under vacuum to increase filling. It is removed and then placed in a $N_2$ purged tube furnace.

3. The furnace is heated at 1° C./min to 850° C., and then held at 850° C. for 1 h. The furnace is then cooled at 5° C./min.

4. Steps 2 & 3 are repeated four times to make an all ceramic microtruss.

EXAMPLE 5

1. A nickel reverse mold of a scaffold is obtained.
2. The mold is soaked in RD-633 under vacuum to increase filling. It is removed and then placed in a $N_2$ purged tube furnace.
3. The furnace is heated at 1° C./min to 850° C., and then held at 850° C. for 1 h. The furnace is then cooled at 5° C./min.
4. Steps 2 & 3 are repeated four times.
5. The filled mold is heated at 500° C. under flowing CO gas to remove the nickel. Here, a three-dimensional ordered ceramic microstructure as shown in FIG. 11 is formed in which Phase 1' is a ceramic material.

Referring back to FIG. 7, a cross-section of a three-dimensional ordered ceramic microstructure is shown. Here, the three-dimensional ordered ceramic microstructure includes a base structure (or scaffold) Phase 1 and one or more ceramic layers Phase 2 coating a surface of the base structure Phase 1. A three-dimensional example of the base structure Phase 1 is shown in FIG. 2, but the present invention is not thereby limited.

More specifically, the base structure Phase 1 includes a plurality of first truss elements defined by a plurality of first self-propagating polymer waveguides and extending along a first direction, a plurality of second truss elements defined by a plurality of second self-propagating polymer waveguides and extending along a second direction, and a plurality of third truss elements defined by a plurality of third self-propagating polymer waveguides and extending along a third direction. Here, the first, second, and third truss elements interpenetrate each other at a plurality of nodes to form a continuous material, and the base structure is self-supporting. In addition, the one or more ceramic layers coat a surface of at least one truss element of the first truss elements, the second truss elements, or the third truss elements.

In one embodiment, the one or more ceramic layers are vapor deposited or infiltrated ceramic layers (or are formed via chemical vapor deposition, chemical vapor infiltration, plasma enhanced chemical vapor deposition, and/or other gas phase deposition technique). That is, the ceramic layers are formed by the precursor solidifying or decomposing on the surface of the truss element. The one or more ceramic layers may include a material selected from the group consisting of silicon carbide, silicon nitride, hafnium carbide, chromium carbide, boron nitride, boron carbide, aluminum oxide, titanium diboride, titanium nitride, zirconium dioxide, titanium carbide, titanium carbonitride, tantalum carbide, tantalum nitride, and combinations thereof.

In one embodiment, the one or more ceramic layers are formed via a reaction between a material of the base structure and a reactant, the reactant being a gas or a liquid. The reactant may include a material selected from the group consisting of silicon carbide, hafnium carbide, chromium carbide, aluminum oxide, zirconium dioxide, trichlorosilane, silane, diatomic oxygen, and combinations thereof. The reaction between the material of the base structure and the reactant may transform the base structure into a substantially ceramic microstructure.

In one embodiment, the one or more ceramic layers are formed via heating of a preceramic polymer applied to the base structure. The preceramic polymer may include a material selected from the group consisting of Starfire RD-633, Starfire SMP-10, Starfire SOC-A35, polysilazanes, polycarbosilanes, silicone resins, polysilanes, polyvinylborazine, polyborazylene, borazine-modified hydrldopolysilazanes, decaborane-based polymers, and combinations thereof.

In one embodiment, each of the first, second, and third truss elements has an axial diameter ranging from about 0.5 mm to about 1 µm.

In one embodiment, the one or more ceramic layers are formed by converting a coating of one or more first ceramic species into one or more second ceramic species.

According to another embodiment of the present invention, the entire three-dimensional ordered ceramic microstructure includes a ceramic material. Referring to FIG. 7, in this case both Phase 1 and Phase 2 would each be a ceramic material. That is, in this embodiment, the three-dimensional ordered ceramic microstructure includes a plurality of first truss elements defined by a plurality of first self-propagating polymer waveguides and extending along a first direction, a plurality of second truss elements defined by a plurality of second self-propagating polymer waveguides and extending along a second direction, and a plurality of third truss elements defined by a plurality of third self-propagating polymer waveguides and extending along a third direction. Here, the first, second, and third truss elements interpenetrate each other at a plurality of nodes to form a continuous material, the continuous material is self-supporting, and each of the first, second, and third truss elements includes a ceramic material.

Figure 9:
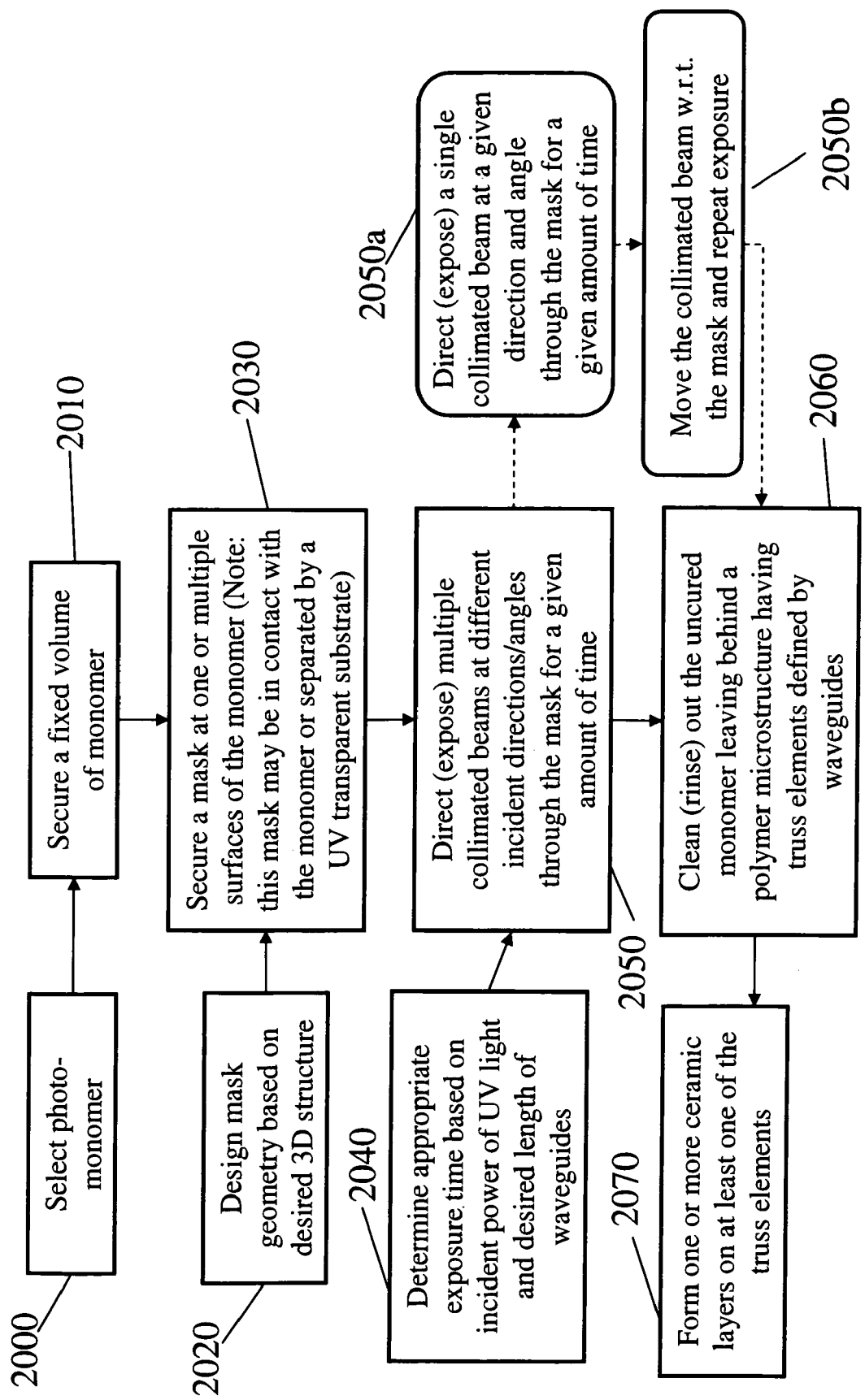
FIG. 9 is a process flow diagram for forming a three-dimensional ordered ceramic microstructure according to an embodiment of the present invention.

FIG. 9 shows a method of forming a three-dimensional ordered ceramic microstructure according to an embodiment of the present invention. As illustrated in FIG. 9, a photo-monomer is selected in block 2000. In block 2010, a volume of the selected photo-monomer is secured (e.g., in a reservoir). A mask geometry is designed based on a desired 3D structure in block 2020. A patterning apparatus, such as a mask having the designed geometry, is secured in block 2030. Here, the secured mask has at least one aperture between at least one collimated light source and the volume of the selected photo-monomer. In addition, the mask may be in contact with the monomer or separated by a substrate (e.g., by a UV transparent substrate).

In block 2040, an appropriate exposure time is determined based on incident power of a collimated light beam from the at least one collimated light source (e.g., an incident power of a UV light) and a desired length of one or more waveguides. The collimated light beam from the at least one collimated light source is directed to the mask for a period of exposure time so that a portion of the collimated beam passes through the mask and is guided by the at least one aperture into the photo-monomer to form at least one waveguide through a portion of the volume of the photo-monomer. Here, the at least one waveguide has a cross-sectional geometry substantially matching the designed aperture geometry on the mask.

In one embodiment as shown in block 2050, multiple collimated beams at different incident directions and/or angles are directed through the mask for a given amount of time.

Alternatively, as shown in blocks 2050*a*, a single collimated beam at a given direction and angle is directed through the mask for a given amount of time. Then, at block 2050*b*, the collimated light beam is moved with respect to the mask and the exposure is repeated.

At block 2060, any uncured photo-monomer is removed to leave behind a 3D ordered polymer microstructure. Here, in one embodiment, the plurality of polymer waveguides are used to form the 3D ordered polymer microstructure, and the 3D ordered polymer microstructure corresponds with the pattern of the plurality of apertures.

Then, at block 2070, one or more ceramic layers are formed on at least one of the truss elements.

According to another embodiment of the present invention, a method of forming a three-dimensional ordered ceramic microstructure includes: securing a volume of a photo-monomer; securing a mask between at least one collimated light source and the volume of the photo-monomer and the volume of the photo-monomer, the mask having a plurality of apertures; directing a collimated light beam from the at least one collimated light source to the mask for a period of exposure time such that a portion of the collimated light beam passes through the mask and is guided by the plurality of apertures into the photo-monomer to form a plurality of waveguides through a portion of the volume of the photo-monomer; removing any uncured photo-monomer to leave behind a three-dimensional polymer microstructure having a plurality of truss elements defined by the plurality of waveguides; and forming one or more ceramic layers on at least one of the truss elements.

In one embodiment, the forming the one or more ceramic layers includes applying a vapor of a chemical precursor to the at least one of the truss elements. The chemical precursor may include a material selected from the group consisting of silicon carbide, silicon nitride, hafnium carbide, chromium carbide, boron nitride, boron carbide, aluminum oxide, titanium diboride, titanium nitride, zirconium dioxide, titanium carbide, titanium carbonitride, tantalum carbide, tantalum nitride, and combinations thereof.

In one embodiment, the forming the one or more ceramic layers includes initiating a reaction between a material of the structure and a reactant, the reactant being a gas or a liquid. The reactant may include a material selected from the group consisting of silicon carbide, hafnium carbide, chromium carbide, aluminum oxide, zirconium dioxide, trichlorosilane, silane, diatomic oxygen, and combinations thereof.

In one embodiment, the forming the one or more ceramic layers includes applying a preceramic polymer to the at least one of the truss elements and heating the preceramic polymer and the at least one of the truss elements. The preceramic polymer may include a material selected from the group consisting of Starfire RD-633, Starfire SMP-10, Starfire SOC-A35, polysilazanes, polycarbosilanes, silicone resins, polysilanes, polyvinylborazine, polyborazylene, borazine-modified hydrldopolysilazanes, and decaborane-based polymers, and combinations thereof.

In one embodiment, the forming the one or more ceramic layers includes converting a coating of one or more first ceramic species into one or more second ceramic species. The covering the coating of the one or more first ceramic species into the one or more second ceramic species includes heating a first coating of silicon carbide, tantalum carbide, or titanium carbide in nitrogen gas to transform the first coating into a second coating of silicon nitride, titanium nitride, or tantalum nitride.

Figure 10:
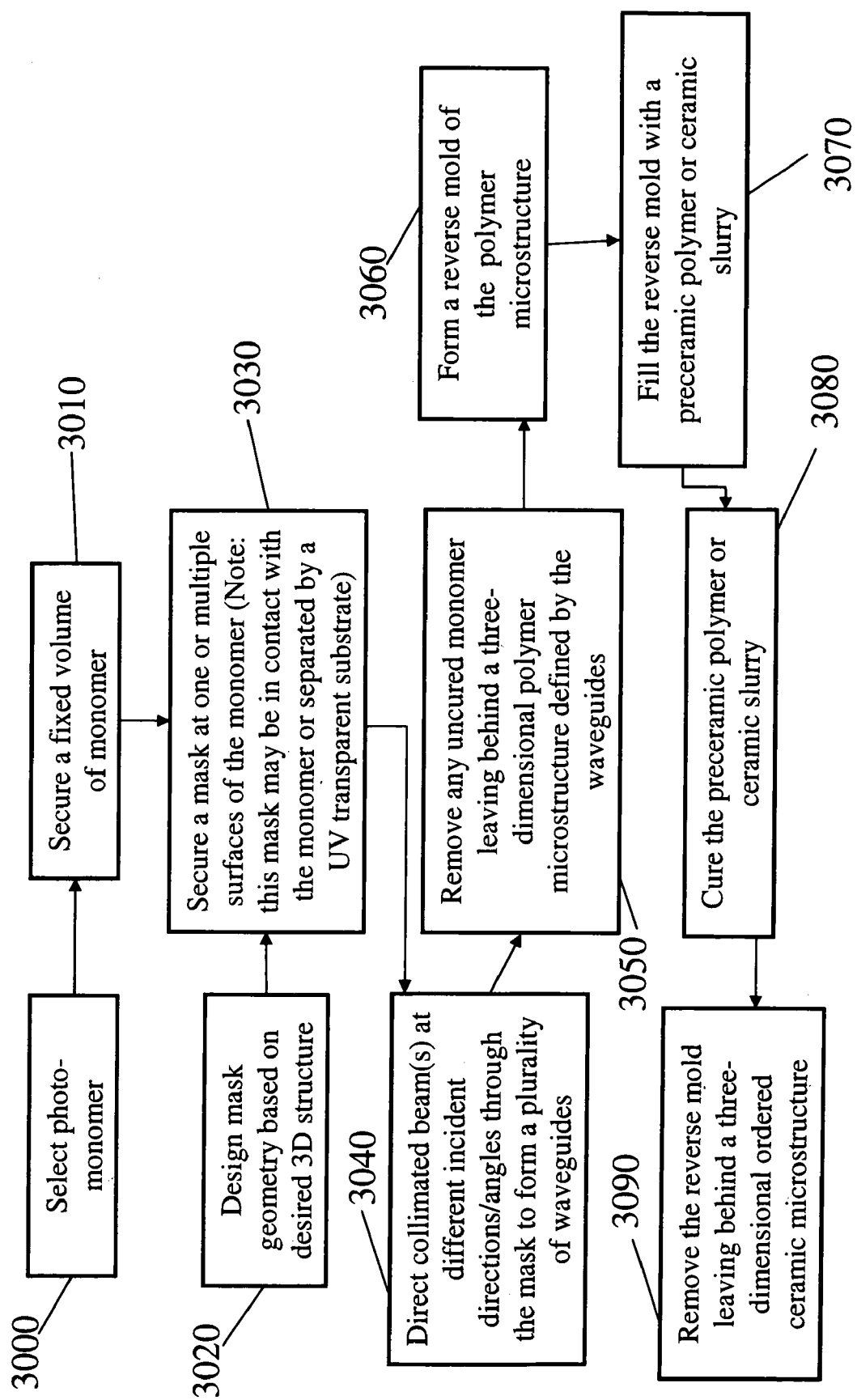
FIG. 10 is a process flow diagram for forming a three-dimensional ordered ceramic microstructure according to another embodiment of the present invention.

FIG. 10 shows a method of forming a three-dimensional ordered ceramic microstructure according to an embodiment of the present invention. As illustrated in FIG. 10, a photo-monomer is selected in block 3000. In block 3010, a volume of the selected photo-monomer is secured (e.g., in a reservoir). A mask geometry is designed based on a desired 3D structure in block 3020. A patterning apparatus, such as a mask having the designed geometry, is secured in block 3030. Here, the secured mask has at least one aperture between at least one collimated light source and the volume of the selected photo-monomer. In addition, the mask may be in contact with the monomer or separated by a substrate (e.g., by a UV transparent substrate).

In block 3040, collimated beam(s) at different incident directions and/or angles are directed through the mask for a given amount of time to form a plurality of waveguides.

At block 3050, any uncured photo-monomer is removed to leave behind a 3D ordered polymer microstructure. Here, in one embodiment, the plurality of polymer waveguides are used to form the 3D ordered polymer microstructure, and the 3D ordered polymer microstructure corresponds with the pattern of the plurality of apertures.

At block 3060, a reverse mold of the polymer microstructure is formed, and the reverse mold is filled with a preceramic polymer or ceramic slurry.

At block 3080, the preceramic polymer or ceramic slurry is cured.

Then, at block 3090, the reverse mold is removed to leave behind the three-dimensional ordered ceramic microstructure.

According to another embodiment of the present invention, a method of forming a three-dimensional ordered ceramic microstructure includes: securing a volume of a photo-monomer; securing a mask between at least one collimated light source and the volume of the photo-monomer and the volume of the photo-monomer, the mask having a plurality of apertures; directing a collimated light beam from the at least one collimated light source to the mask for a period of exposure time such that a portion of the collimated light beam passes through the mask and is guided by the plurality of apertures into the photo-monomer to form a plurality of waveguides through a portion of the volume of the photo-monomer; removing any uncured photo-monomer to leave behind a three-dimensional polymer microstructure defined by the plurality of waveguides; forming a reverse mold of the three-dimensional polymer microstructure; filling the reverse mold with a preceramic polymer or ceramic slurry; curing the preceramic polymer or ceramic slurry; and removing the reverse mold to leave behind the three-dimensional ordered ceramic microstructure.

In view of the foregoing, a ceramic microtruss according to an embodiment of the present invention has a structure based on an optically defined polymer microtruss.

In one embodiment, ceramic microtruss is formed by coating a polymer, carbon, graphite, or metal microtruss with a ceramic. The coating may be made of silicon carbide, silicon nitride, hafnium carbide, chromium carbide, boron nitride, boron carbide, aluminum oxide, titanium diboride, titanium nitride, zirconium dioxide, titanium carbide, titanium carbonitride, tantalum carbide, and tantalum nitride. The coating is applied by a chemical vapor deposition, chemical vapor infiltration, plasma enhanced chemical vapor deposition, and/or other gas phase deposition technique. That is, the ceramic layers are formed by the precursor solidifying or decomposing on the surface of the truss element. The one or more ceramic layers may include a material selected from the group consisting of silicon carbide, silicon nitride, hafnium carbide, chromium carbide, boron nitride, boron carbide, aluminum oxide, titanium diboride, titanium nitride, zirconium dioxide, titanium carbide, titanium carbonitride, tantalum carbide, tantalum nitride, and combinations thereof.

In one embodiment, the coating is applied by reacting the starting microtruss with a gas or liquid phase reactant. Possible reactants are $SiHCl_3$, $SiH_4$, and $O_2$.

In one embodiment, the coating is applied by converting a coating of one ceramic species to another ceramic species through a chemical reaction. Here, for example, a SiC coated microtruss may be heated in the presence of $N_2$ to transform it to a $Si_4N_3$ coated microtruss, TaC coated microtruss may be heated in the presence of $N_2$ to transform it to a TaN coated microtruss, and/or a TiC coated microtruss may be heated in the presence of N2 to transform it to a TiCN coated microtruss.

In one embodiment, the coating is applied by coating the starting scaffold with a preceramic polymer. Applicable preceramic polymers are Starfire RD-633, Starfire RD-212, Starfire SMP-10, Starfire SOC-A35, Clariant/KiON Ceraset 20 (polysilazanes), polycarbosilanes, silicone resins, polysilanes, and decaborane based polymers and monomers, or mixtures of these species.

In addition, an all-ceramic microtruss according to an embodiment of the present invention is made by reacting a metal, carbon, or graphite microtruss with a reactant that mostly or completely transforms it into a ceramic. In one embodiment, the all oxide microtruss is made by reacting a metal microtruss with oxygen; reacting a carbon or graphite microtruss with SiHCl3 or SiH4; and/or reacting a ceramic microtruss with a transforming reactant that transforms it into a new ceramic species. The transforming reactant may be N2 gas.

An all-ceramic microtruss according to another embodiment of the present invention is made by filling a reverse mold of the original polymer microtruss with a preceramic polymer or ceramic slurry, curing the preceramic polymer or ceramic slurry, and then chemically or thermally removing the mold.

While the invention has been described in connection with certain exemplary embodiments, it is to be understood by those skilled in the art that the invention is not limited to the disclosed embodiments, but, on the contrary, is intended to cover various modifications included within the spirit and scope of the appended claims and equivalents thereof.

What is claimed is:

1. A three-dimensional ordered ceramic microstructure comprising:
   a base structure comprising:
      a plurality of first truss elements defined by a plurality of first self-propagating polymer waveguides and extending along a first direction;
      a plurality of second truss elements defined by a plurality of second self-propagating polymer waveguides and extending along a second direction; and
      a plurality of third truss elements defined by a plurality of third self-propagating polymer waveguides and extending along a third direction,
      wherein the first, second, and third truss elements interpenetrate each other at a plurality of nodes to form a continuous material, and
      wherein the base structure is self-supporting; and
   one or more ceramic layers coating a surface of at least one truss element of the first truss elements, the second truss elements, or the third truss elements.

2. The three-dimensional ordered ceramic microstructure of claim 1, wherein the one or more ceramic layers are vapor deposited or infiltrated ceramic layers.

3. The three-dimensional ordered ceramic microstructure of claim 2, wherein the one or more ceramic layers comprise a material selected from the group consisting of silicon carbide, silicon nitride, hafnium carbide, chromium carbide, boron nitride, boron carbide, aluminum oxide, titanium diboride, titanium nitride, zirconium dioxide, titanium carbide, titanium carbonitride, tantalum carbide, tantalum nitride, and combinations thereof.

4. The three-dimensional ordered ceramic microstructure of claim 1, wherein the one or more ceramic layers are formed via a reaction between a material of the base structure and a reactant, the reactant being a gas or a liquid.

5. The three-dimensional ordered ceramic microstructure of claim 4, wherein the reactant comprises a material selected from the group consisting of silicon carbide, hafnium carbide, chromium carbide, aluminum oxide, zirconium dioxide, trichlorosilane, silane, diatomic oxygen, and combinations thereof.

6. The three-dimensional ceramic microstructure of claim 4, wherein the reaction between the material of the base structure and the reactant transforms the base structure into a substantially ceramic microstructure.

7. The three-dimensional ordered ceramic microstructure of claim 1, wherein the one or more ceramic layers are formed via heating of a preceramic polymer applied to the base structure.

8. The three-dimensional ordered ceramic microstructure of claim 7, wherein the preceramic polymer comprises a material selected from the group consisting of polysilazanes, polycarbosilanes, silicone resins, polysilanes, polyvinylborazine, polyborazylene, borazine-modified hydrldopolysilazanes, decaborane-based polymers, and combinations thereof.

9. The three-dimensional ordered ceramic microstructure of claim 1, wherein each of the first, second, and third truss elements has an axial diameter ranging from about 0.5 mm to about 1 μm.

10. The three-dimensional ordered ceramic structure of claim 1, wherein the one or more ceramic layers are formed by converting a coating of one or more first ceramic species into one or more second ceramic species.

11. A three-dimensional ordered ceramic microstructure comprising:
   a plurality of first truss elements defined by a plurality of first self-propagating polymer waveguides and extending along a first direction;
   a plurality of second truss elements defined by a plurality of second self-propagating polymer waveguides and extending along a second direction; and
   a plurality of third truss elements defined by a plurality of third self-propagating polymer waveguides and extending along a third direction,
   wherein the first, second, and third truss elements interpenetrate each other at a plurality of nodes to form a continuous material,
   wherein the continuous material is self-supporting, and
   wherein each of the first, second, and third truss elements comprises a ceramic material.

* * * * *